Aug. 31, 1943.   R. H. DYER   2,328,433
TOOL FOR REMOVING ELECTRODE TIPS
Filed March 15, 1941   2 Sheets-Sheet 2
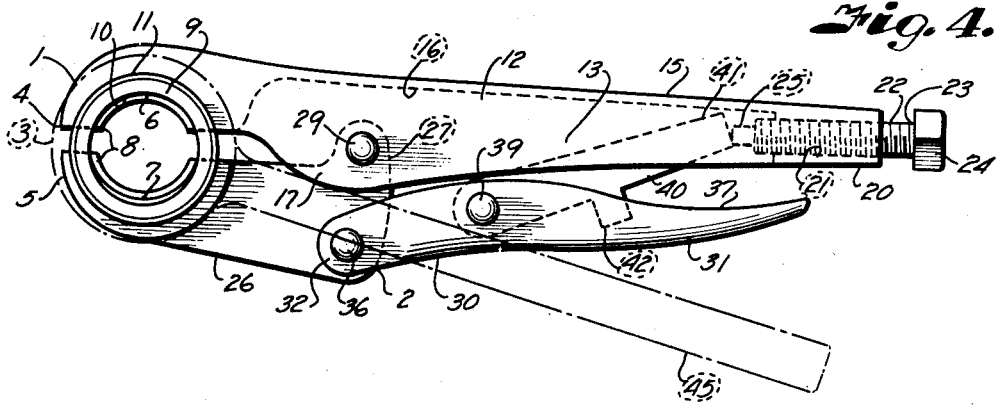
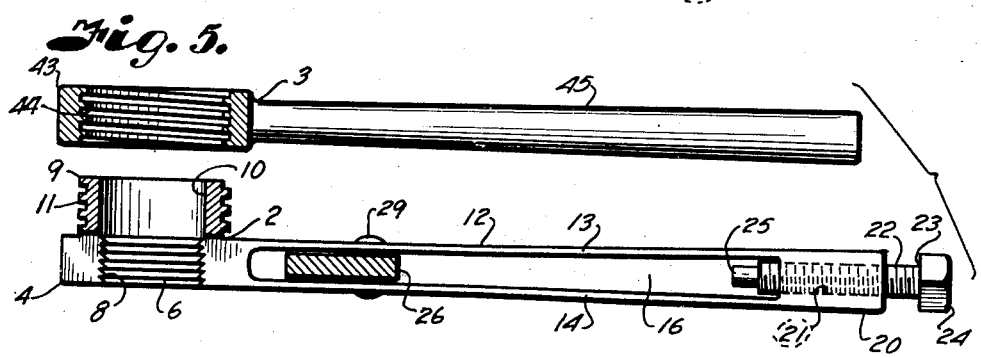
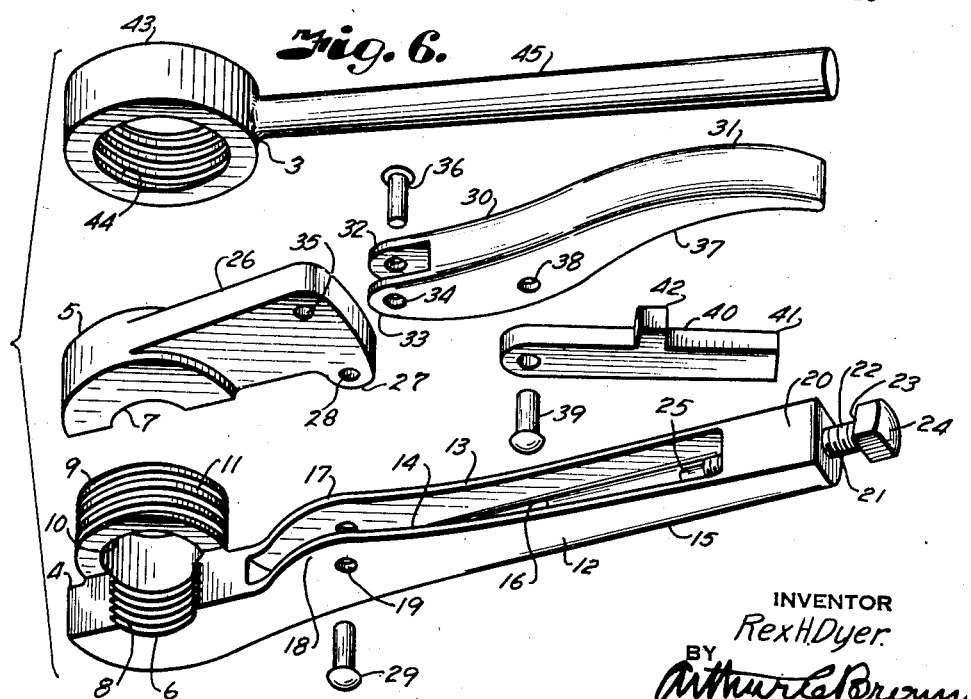
INVENTOR
Rex H Dyer.
BY
Arthur La Brown
ATTORNEY Patented Aug. 31, 1943

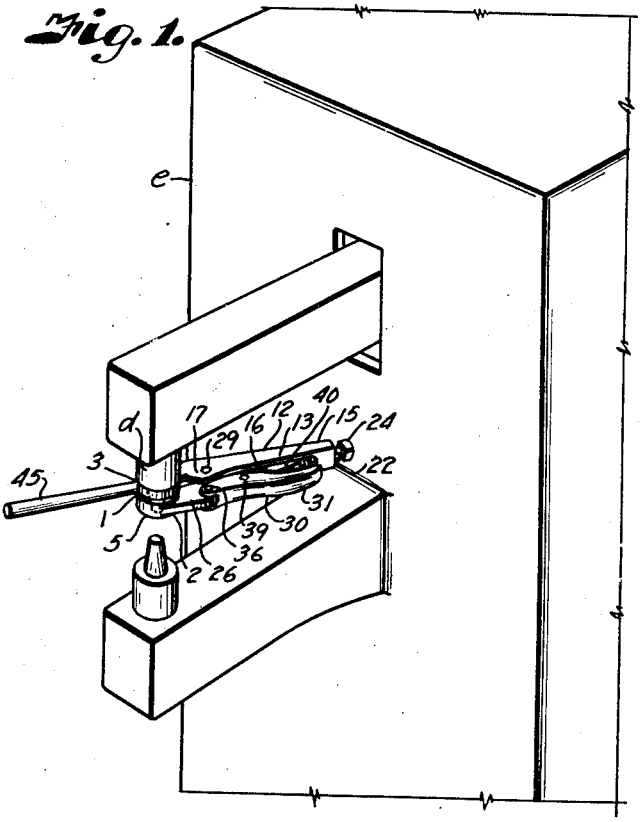

2,328,433

UNITED STATES PATENT OFFICE 2,328,433

TOOL FOR REMOVING ELECTRODE TIPS

Rex H. Dyer, Kansas City, Mo., assignor of one-half to Harry Allshouse

Application March 15, 1941, Serial No. 383,581

6 Claims. (Cl. 29—86.1)

This invention relates to a tool for removing electrode tips of welding machines wherein the tips have tapered shanks that are wedged in tapered sockets of the holders therefor. Since the tips and holders are hollow and have interconnected passages for the circulation of a cooling medium, scale and corrosion collect around the tapered shanks of the tips and make it difficult to withdraw the tips when it is necessary to replace them.

Therefore, the principal object of the invention is to provide a tool whereby the tips may be readily withdrawn from their tapered sockets without injuring or in any way damaging the holders.

In accomplishing this and other objects of the invention, as hereinafter pointed out, I have provided improved details of structure, the preferred form of which is illustrated in the accompanying drawings, wherein:

Fig. 1 is a perspective view of the head of a welding machine and showing a tool which embodies the features of the present invention applied to one of the electrode tips for effecting removal thereof.

Fig. 2 is a fragmentary section through the tip, the tip holder, and head of the tool.

Fig. 3 is a plan view of the gripping element of the tool with the jack element shown in dot and dash lines.

Fig. 4 is a view similar to Fig. 3 but showing the gripping element in clamped position.

Fig. 5 is a longitudinal section through the tool elements on the line 5—5 of Fig. 3.

Fig. 6 is a perspective view of the parts of the tool shown in disassembled spaced relation.

Referring more in detail to the drawings:

1 designates a tool constructed in accordance with the present invention and particularly designed for effecting removal of an electrode tip from its holder. The tool includes a gripping element 2 for gripping the electrode tip and a jack element 3 cooperating with the gripping element for effecting withdrawal of the tapered shank of the electrode tip from its holder, as later described. The gripping element 2 comprises cooperating jaw members 4 and 5 having substantially arcuate gripping faces 6 and 7 provided with a plurality of teeth 8 adapted to bite into the metal of the electrode tip. Fixed on one of the jaws and extending laterally therefrom in concentric relation with the arcuate face thereof is a ring-like collar 9 having an axial opening 10 to pass an electrode tip and provided on the exterior surface with threads 11.

The jaw 4 carrying the threaded collar has a handle lever 12 extending laterally therefrom and which is of substantially channel-shaped cross-section to provide spaced flanges 13 and 14 on the respective sides of a rounded finger gripping portion 15. The flanges 13 and 14 cooperate with the gripping portion 15 to form an elongated recess 16 opening through the face of the lever in the direction of the other jaw member 5. The flanges 13 and 14 project from the body of the handle to form ears 17 and 18 having axially aligned openings 19 therethrough, as best shown in Fig. 6. The end 20 of the handle lever opposite the jaw is of solid construction and has an internally threaded bore 21 extending substantially coaxially with the handle for receiving the threaded shank 22 of a set-screw 23. The set-screw has a head 24 in the exterior end thereof whereby the shank is adjustably threaded in the bore 21. The inner end of the set-screw terminates in the recess 16 and is provided with a reduced pintle 25.

The other jaw 5 has an arm portion 26 terminating in a laterally extending ear 27 received between the ears 17 and 18 of the handle lever of the other jaw and which is provided with an opening 28 registering with the openings 19 to pass a pivot member, such as a rivet 29, on which the jaw 5 is pivoted to and from the jaw 4.

Pivotally mounted on the arm 26, at the side opposite the ear 27, is a handle member 30 having a portion 31 shaped to fit the palm of the hand and having forwardly extending ears 32 and 33 spaced apart to accommodate the arm 26. The ears 32 and 33 have openings 34 registering with an opening 35 in the arm 26 for passing a fastening device such as a rivet 36, whereby the handle member 30 is pivotally connected with the jaw 5. The handle member 30 is also of channel-shaped cross-section and has an open side 37 facing the open side of the channel-like recess of the other handle lever.

Formed in the handle lever, in spaced relation with the pivotal connection of the handle member, are openings 38 for passing a rivet 39, or the like, to pivotally mount a toggle arm 40 therebetween. The toggle arm has a free end 41 projecting into the recess 16 to engage against the pintle 25 of the set-screw. The toggle arm also has a lateral stop 42 projecting from the side thereof adjacent the handle member 30, as shown in Figs. 3 and 4.

The jack element 3 includes a ring or collar 43 having internal threads 44 adapted to engage the external threads 11 on the ring-like collar 9, as shown in Fig. 2. Extending from the collar 43 is a handle 45 whereby the collar 43 is turned upon the collar 9.

The tool just described is particularly designed for removing the electrode tip *a* having a tapered shank *b* from the tapered socket *c* of a holder *d* of a welding machine *e*. The holder *d* has a water channel *f* opening into a water chamber *g* in the electrode tip.

The electrode structure thus described is conventional and specifically forms no part of the present invention, however, it is illustrated to give a better understanding of the operation of my improved tool, as now to be described.

In removing the electrode tip *a*, the jack element 3 is threaded upon the collar 9 on the jaw 4 of the gripping element 2 and the assembly is slipped over the body of the electrode tip *a* so that the face of the jacket collar is in position to engage the lower end of the tip holder. The set-screw 23 is then adjusted so that when the handle levers 12 and 30 are drawn toward each other to bring the jaws 3 and 4 into gripping engagement with the body of the electrode tip, the pivot 29 for the toggle member will spring past dead center position between the handle lever and the terminal end of the set-screw so that the jaws are retained in gripping engagement with the body of the electrode tip. The teeth 8 on the jaws bit sufficiently into the metal of the tip so that the jaws are retained thereby from longitudinal movement.

The handle 45 of the jack element 3 is then gripped with one hand and the levers 12 and 13 of the gripping device 4 with the other hand. While the gripping device is being held from movement, the handle 45 of the jack element is moved with respect thereto so that the collar of the jack element is threaded against the end of the tip holder, thereby assuring a wedging pressure between the holder and the gripping element of the tool. Since the tool grips the electrode tip, the pressure acts to effect withdrawal of the tapered shank *b* from the tapered socket *c* of the holder so that the tip is readily withdrawn therefrom without damage to the holder. Upon removal of the upper tip, the lower tip of the welding machine may be removed in like manner.

From the foregoing it is obvious that I have provided a tool which is of relatively simple construction and which is designed to facilitate removal of the electrode tips of a welding machine without in any way damaging the holders retaining the tips.

What I claim and desire to secure by Letters Patent is:

1. A tool for removing the tip from the holder of a welding machine including, jaws having gripping faces arranged to circumferentially engage the tip, a lever arm extending from one of the jaws and laterally with respect to the axis of the tip when gripped by said jaws, an arm extending from the other jaw alongside the lever arm, connecting means hinging said arms on an axis parallel with respect to the axis of said tip, jack means fixed to one of the jaws substantially coaxial with the gripping face of said jaw and in a position to engage the holder when the tool is moved axially over the end of said tip, and means for actuating the jack means for exerting an axial pressure bettwen the jaws and the holder to effect withdrawal of the tip from the holder.

2. A tool for removing the tip from the holder of a welding machine including, jaws having gripping faces arranged to circumferentially engage the tip, a lever arm extending from one of the jaws and laterally with respect to the axis of the tip when gripped by said jaws, an arm extending from the other jaw in substantially the plane of the lever arm, connecting means hinging said arms on an axis parallel with respect to the axis of said tip, a collar on one of the jaws to circle the tip when the tool is moved axially over the end of said tip, locking means interconnecting said arms for retaining the jaws in gripping relation with the tip, a ring having threaded engagement with the collar, and means for turning the ring for exerting an axial pressure between the jaws and the holder to effect withdrawal of the tip from the holder.

3. A tool for removing the tip from the holder of a welding machine including, jaws having gripping faces arranged to circumferentially engage the tip, a lever arm extending from one of the jaws and laterally with respect to the axis of the tip when gripped by said jaws, an arm extending from the other jaw alongside the lever arm, connecting means hinging said arms on an axis parallel with respect to the axis of said tip, a ring-like collar on one of the jaws and in a position to encircle the tip when the tool is moved axially over the end of said tip, a ring having threaded engagement with the collar to engage the holder, and an arm extending radially of the ring to turn the ring on the collar and exert an axial pressure between the jaws and the holder to effect withdrawal of the tip gripped by said jaws.

4. A tool for removing the tip from the holder of a welding machine including, jaws having gripping faces arranged to circumferentially engage the tip, a lever arm extending from one of the jaws and laterally with respect to the axis of the tip when gripped by said jaws, an arm extending from the other jaw alongside the lever arm, connecting means hinging said arms on an axis parallel with respect to the axis of said tip, a ring-like collar on one of the jaws and in a position to encircle the tip when the tool is moved axially over the end of said tip, locking means interconnecting said arms for retaining the jaws in gripping relation with the tip, a ring having threaded engagement with the collar and adapted to engage the holder, and an arm extending radially of the ring to turn the ring on the collar and exert an axial pressure between the jaws and the holder to effect withdrawal of the tip gripped by said jaws.

5. A tool for removing the tip from the holder of a welding machine including, jaws having gripping faces arranged to engage the tip circumferentially thereof, a lever arm extending from one of the jaws and laterally with respect to the axis of the tip when gripped by said jaws, an arm extending from the other jaw substantially in the plane of the lever arm, connecting means hinging said arms on an axis parallel with respect to the axis of said tip, a handle lever pivoted to the last named arm and cooperating with the lever arm in positioning the jaws in contact with the tip, a toggle lever having pivotal connection with the handle lever and stop engagement with the lever arm, said handle lever being movable toward the lever arm to bring said jaws in gripping position and locate said pivotal connection for the toggle lever in a dead center position between said pivotal connection of the handle lever and said point of stop engagement, jack means carried by one of the jaws, and means for actuating the jack means to exert a thrust between the electrode holder and said jaws to effect withdrawal of the tip from the holder.

6. A tool for removing the tip from the holder of a welding machine including, jaws having gripping faces arranged to engage the circumference of the tip, a lever arm extending from one of the jaws laterally with respect to the axis of the tip when gripped by said jaws, an arm extending from the other jaw substantially in the plane of the lever arm, connecting means hinging said arms on an axis parallel with respect to the axis of said tip, a handle lever pivoted to the last named arm, a toggle lever having pivotal connection with the handle lever and stop engagement with the first named lever arm to effect locking of the jaws on the electrode tip, a ring-like collar on one of the jaws and in position to encircle the tip when the tool is moved axially over the end of said tip to bring the collar in engagement with the holder, a ring having threaded engagement with the collar, and an arm extending from the ring to turn the ring on the collar and exert an axial pressure between the jaws and the holder to effect withdrawal of the tip from said holder.

REX H. DYER.